(12) United States Patent
Hung et al.

(10) Patent No.: US 6,887,566 B1
(45) Date of Patent: May 3, 2005

(54) CERIA COMPOSITION AND PROCESS FOR PREPARING SAME

(75) Inventors: Cheng-Hung Hung, Champaign, IL (US); Joseph D. Smith, Owasso, OK (US); George P. Fotou, Champaign, IL (US); Kenneth C. Koehlert, Carlisle, MA (US)

(73) Assignee: Cabot Corporation, Boston, MA (US)

( * ) Notice: Subject to any disclaimer, the term of this patent is extended or adjusted under 35 U.S.C. 154(b) by 241 days.

(21) Appl. No.: 09/715,634

(22) Filed: Nov. 17, 2000

Related U.S. Application Data

(60) Provisional application No. 60/165,955, filed on Nov. 17, 1999.

(51) Int. Cl.[7] .......................... B32B 19/00; B32B 15/02; C01F 17/00; C09D 1/00; C09C 1/36
(52) U.S. Cl. .................... 428/357; 428/402; 106/286.1; 106/286.8; 106/439; 423/263
(58) Field of Search ................................ 428/357, 402; 106/286.1, 286.8, 439, 3; 423/263

(56) References Cited

U.S. PATENT DOCUMENTS

| | | | |
|---|---|---|---|
| 2,631,083 A | 3/1953 | Engelson et al. | 423/178 |
| 2,693,406 A | 11/1954 | Wendell, Jr. et al. | 423/625 |
| 2,771,344 A | 11/1956 | Michel et al. | 423/633 |
| 2,773,741 A | 12/1956 | Antonsen | 423/625 |
| 2,780,525 A | 2/1957 | Wendell, Jr. et al. | 423/625 |
| 2,801,901 A | 8/1957 | Dingman et al. | 423/625 |
| 2,803,038 A | 8/1957 | Holland et al. | 425/222 |
| 2,828,186 A | 3/1958 | Dingman et al. | 423/625 |
| 2,829,949 A | 4/1958 | Wendell, Jr. et al. | 422/150 |
| 2,847,316 A | 8/1958 | Michel et al. | 106/450 |
| 3,006,738 A | 10/1961 | Wagner | 422/208 |
| 3,007,774 A | 11/1961 | Stokes et al. | 423/132 |
| 3,024,089 A | 3/1962 | Spencer et al. | 423/336 |

(Continued)

FOREIGN PATENT DOCUMENTS

| | | |
|---|---|---|
| DE | 196 50 500 | 6/1998 |
| GB | 1371218 | 10/1974 |
| GB | 1371219 | 10/1974 |
| GB | 1513890 | 6/1978 |
| GB | 2037726 | 7/1980 |

OTHER PUBLICATIONS

Hasegawa et al., "Effect of Additive Oxides on Ultrafine $CeO_2$ Particles Synthesized by the Spray–ICP Technique," *Journal of Materials Science Letters*, vol. 15, No. 18, pp. 1608–1611 (Sep. 15, 1996).

Vallet–Regi et al., "Synthesis and Characterization of $CeO_2$ Obtained by Spray Pyrolysis Method," *Materials Science Forum*, vols. 235–238, pp. 291–296 (1997).

Suzuki et al., "Synthesis of Ultrafine Single–Component Oxide Particles by the Spray–ICP Technique," *Journal of Materials Science*, vol. 27, No. 3, pp. 679–684 (Feb. 1, 1992).

Sano et al., "Analysis of Production Process of Oxidized Metallic Powder (Preparation of Cerium Dioxide Articles by Sprat Pyrolysis Method," *Proceedings of ICLASS–1997*, pp. 1045–1052 (Aug. 18–22, 1997).

*Primary Examiner*—D. S. Nakarani
*Assistant Examiner*—Sheeba Ahmed

(57) ABSTRACT

The present invention provides a cerium oxide particulate composition and a process for preparing a cerium oxide particulate composition comprising aggregates of approximately spherical primary particles of cerium oxide. The method involves preparing a solution of a cerium oxide precursor, aerosolizing the cerium oxide precursor solution, and heating the aerosol to provide the cerium oxide particle composition.

18 Claims, 3 Drawing Sheets

U.S. PATENT DOCUMENTS

| | | | |
|---|---|---|---|
| 3,065,093 A | 11/1962 | Berstein et al. | 106/253 |
| 3,112,210 A | 11/1963 | Carpenter | 423/336 |
| 3,130,008 A | 4/1964 | Stokes et al. | 106/253 |
| 3,166,542 A | 1/1965 | Orzechowski et al. | 423/336 |
| 3,203,762 A | 8/1965 | Carpenter | 526/96 |
| 3,205,177 A | 9/1965 | Orzechowski et al. | 423/613 |
| 3,205,178 A | 9/1965 | Orzechowski et al. | 502/104 |
| 3,212,911 A | 10/1965 | Berstein et al. | 106/437 |
| 3,322,499 A | 5/1967 | Carpenter et al. | 423/613 |
| 3,363,980 A | 1/1968 | Krinov | 423/613 |
| 3,365,274 A | 1/1968 | Carpenter et al. | 423/613 |
| 3,372,001 A | 3/1968 | Wendell | 422/150 |
| 3,406,228 A | 10/1968 | Hardy et al. | 264/0.5 |
| 3,455,653 A | 7/1969 | Aftandilian | 423/613 |
| 3,488,204 A | 1/1970 | Jordan et al. | 106/447 |
| 3,493,342 A | 2/1970 | Weaver, Jr. et al. | 423/613 |
| 3,510,291 A | 5/1970 | Brush | 264/5 |
| 3,510,292 A | 5/1970 | Hardy et al. | 75/344 |
| 3,607,049 A | 9/1971 | Weaver | 423/614 |
| 3,663,283 A | 5/1972 | Herbert et al. | 106/401 |
| 4,023,961 A | 5/1977 | Douglas et al. | 75/355 |
| 4,048,290 A | 9/1977 | Lee | 423/336 |
| 4,292,290 A | 9/1981 | Tunison, III | 423/336 |
| 4,624,941 A | 11/1986 | Berndt et al. | 502/302 |
| 4,713,233 A * | 12/1987 | Marsh et al. | 423/608 |
| 4,910,180 A | 3/1990 | Berndt et al. | 502/304 |
| 4,937,062 A | 6/1990 | Jordan et al. | 423/592 |
| 5,246,624 A | 9/1993 | Miller et al. | 516/86 |
| 5,256,389 A | 10/1993 | Jordan et al. | 423/592 |
| 5,342,597 A | 8/1994 | Tunison, III | 423/593 |
| 5,447,708 A | 9/1995 | Helble et al. | 204/164 |
| 5,460,701 A | 10/1995 | Parker et al. | 204/164 |
| 5,472,493 A | 12/1995 | Regan | 106/491 |
| 5,599,511 A | 2/1997 | Helble et al. | 422/232 |
| 5,851,507 A | 12/1998 | Pirzada et al. | 423/659 |
| 5,858,313 A | 1/1999 | Park et al. | 422/189 |
| 5,874,684 A | 2/1999 | Parker et al. | 75/228 |
| 5,876,683 A | 3/1999 | Glumac et al. | 423/325 |
| 5,891,205 A | 4/1999 | Piardi et al. | 51/308 |
| 5,897,675 A | 4/1999 | Mangold et al. | 51/309 |
| 5,938,837 A | 8/1999 | Hanawa et al. | 117/68 |

* cited by examiner

CERIA COMPOSITION AND PROCESS FOR PREPARING SAME

CROSS-REFERENCE TO RELATED PATENT APPLICATIONS

This patent application claims priority to provisional U.S. patent application Ser. No. 60/165,955 filed on Nov. 17, 1999.

TECHNICAL FIELD OF THE INVENTION

The present invention relates to a cerium oxide particulate composition and a process for preparing a cerium oxide particulate composition.

BACKGROUND OF THE INVENTION

A substantial demand for cerium oxide compositions has developed over the last 10–15 years. Cerium oxide compositions are used in diverse industries such as the automobile and semiconductor industries. In the automobile industry cerium oxide is included in catalytic converter coatings where it helps to oxidize incomplete combustion products. In the semiconductor industry, cerium oxide is used as an abrasive composition for polishing semiconductor wafers. Cerium oxide also is used for polishing glass, as an absorber for ultraviolet light, in cosmetics, in mixtures for petroleum-refining catalysts, in nickel-hydride batteries, as glass additives, in structural ceramics, in televisions, as part of oxygen sensors, and as an iron and steel additive.

Various methods have been disclosed for the production of pyrogenic cerium oxide compositions. For example, U.S. Pat. No. 5,851,507 (Pirzada) discloses a method of producing pyrogenic cerium oxide by processing powdered cerium oxide at very high temperatures using a plasma arc reactor. However, there continues to be a need for other cerium oxide compositions and methods for their production. The present invention provides such a composition and method. These and other advantages of the present invention, as well as additional inventive features, will be apparent from the description of the invention provided herein.

BRIEF SUMMARY OF THE INVENTION

The present inventive method of preparing a cerium oxide particle composition comprises preparing a solution consisting essentially of a cerium oxide precursor, converting the cerium oxide precursor solution into an aerosol having droplets with a diameter of about 100 μm or less, heating the aerosol by passing the aerosol through a high temperature reaction zone so that the cerium oxide precursor is converted to aggregates consisting essentially of approximately spherical primary particles of cerium oxide, and recovering the resulting aggregates as a cerium oxide particle composition.

The cerium oxide particulate composition of the present invention comprises aggregates consisting essentially of approximately spherical primary particles of cerium oxide, wherein at least some of the aggregates are cenospherical aggregates.

DETAILED DESCRIPTION OF THE INVENTION

Figure 1:
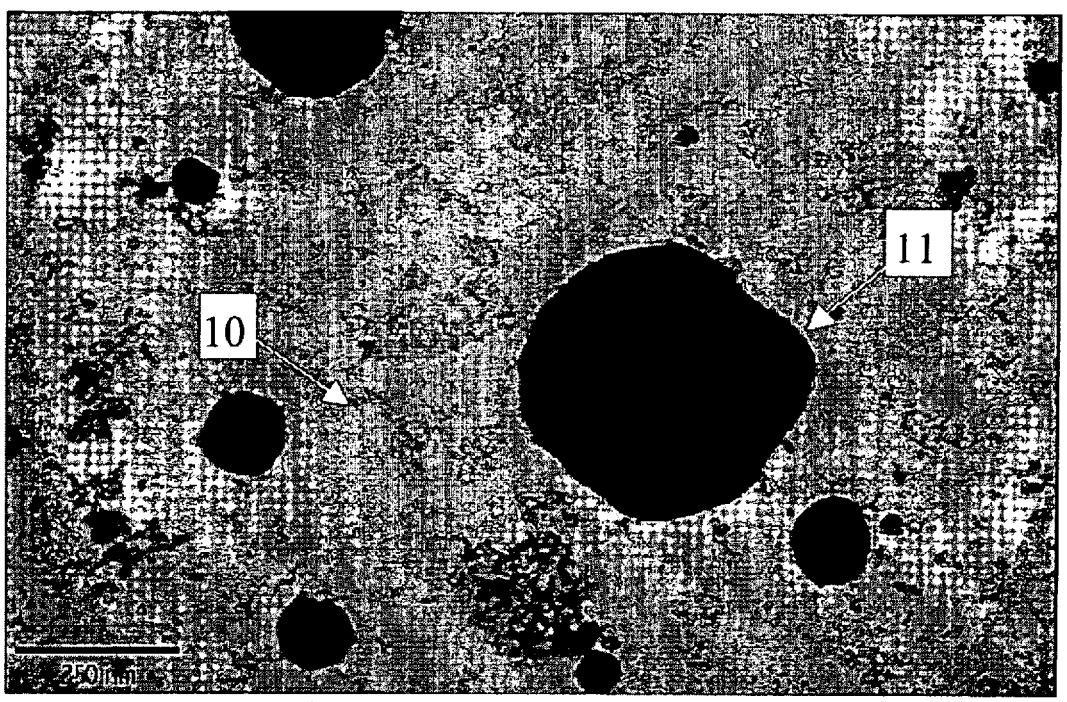
FIG. 1 is a transmission electron micrograph (40,000x) of a cerium oxide particulate composition produced in accordance with the present invention.

The process of the present invention involves preparing a solution consisting essentially of a cerium oxide precursor, converting the solution to an aerosol having droplets of about 100 μm or less, passing the aerosol through a high temperature reaction zone so that the cerium oxide precursor is converted into aggregates consisting essentially of (or even consisting of) approximately spherical primary particles of cerium oxide, and recovering the resulting aggregates as a cerium oxide particulate composition. The cerium oxide product prepared according to the process of this invention is typically substantially free of contamination. Thus, additional processing steps, such as calcination, are not generally necessary, although they may provide certain advantages in some applications as will be appreciated by those of skill in the art.

The cerium oxide precursor can be any suitable compound that can be converted into cerium oxide in accordance with the present invention. Suitable cerium oxide precursors include cerium alkoxides, such as cerium isopropoxide, cerium acetate, cerium acetylacetonate, cerium oxalate, and cerium carboxylate, cerium nitrate, cerium chloride, cerium perchlorate, and cerium sulfate, and mixtures thereof. The cerium oxide precursors can be in any of the various possible hydration states. Cerium acetate and cerium acetylacetonate are preferred because of their stability and availability. Use of cerium chloride precursors can result in cerium oxide particles that contain some amount of chloride. Thus, in applications where chloride contamination of the cerium oxide particulate composition can be a problem, it may be necessary to utilize additional processing steps to minimize or eliminate such contamination. This may be accomplished using methods generally known in the art.

The solution of the cerium oxide precursor can be prepared in any suitable manner. Generally, the cerium oxide precursor solution is prepared by mixing a cerium oxide precursor with a suitable solvent therefor. Suitable solvents include water and organic solvents. A suitable organic solvent does not leave residual contaminants in the cerium oxide particulate composition. As with the cerium oxide precursor, solvents containing chloride are not desirable where chloride contamination of the cerium oxide particulate composition can be a problem. The use of a chloride-free cerium oxide precursor solution avoids the need to remove chloride from the cerium oxide particulate composition by an additional calcining step that would add to the cost and complexity of production.

Desirably, the solvent is water, alone or in combination with an organic solvent. A preferred organic solvent for use in combination with water as the solvent is both volatile and combustible and improves the aerosol forming ability (i.e., by reducing the surface tension) of the precursor solution, such as an alcohol, particularly methanol or ethanol. Generally, the precursor solution does not contain more than about 10 wt. % of such an organic solvent in combination water. The organic solvent (e.g., alcohol) can be added directly to the feedstock cerium oxide precursor solution, or can be combined with the precursor solution at any time prior to reaching the high temperature reaction zone.

The cerium oxide precursor can have any suitable concentration in the solution thereof. A suitable concentration is, for example, any concentration at which the cerium oxide precursor can be aerosolized. Higher cerium oxide precursor concentrations generally are preferred to lower cerium oxide precursor concentrations in order to maximize production rates. Cerium oxide precursor concentrations that approach saturation in the solution thereof are particularly preferred. As will be appreciated by those of ordinary skill in the art, the saturation point of the cerium oxide precursor solution will depend upon the particular solvent and cerium oxide precursor used, as well as external factors such as pH, temperature and pressure. Thus, in some preparations, the concentration of the cerium oxide precursor in the solution typically will be about 5 wt. % or more, preferably about 10 wt. % or more, more preferably about 12 wt. % or more, and most preferably about 14 wt. % or more. In other preparations, the cerium oxide precursor in the solution will be about 20 wt. % or more, preferably about 30 wt. % or more, most preferably about 40 wt. %.

The cerium oxide precursor solution can have any suitable pH, which can be adjusted with any suitable pH adjuster. The cerium oxide precursor solution preferably has an acidic pH (e.g., pH less than about 7), more preferably a pH of about 3–6 or even a pH of about 4–6 (e.g., pH of about 4.5–5.5). Any suitable acid can be used to adjust the pH of the cerium oxide precursor solution. A desirable acid adjusts the pH of the precursor solution without significantly diluting the precursor solution or contaminating it with compounds that will carry through to the cerium oxide particle composition. Although a variety of acids are suitable, nitric acid typically is used. Hydrochloric acid may be used for certain applications; however, the added chloride can be carried through into the cerium oxide particulate composition. Thus, in applications where chloride contamination is a concern, use of hydrochloric acid may necessitate additional processing steps to minimize or eliminate such contamination. This may be accomplished by methods generally known in the art.

The cerium oxide precursor solution can contain additional components, such as surfactants. Desirable surfactants reduce the surface tension of the precursor solution so that aerosols generated from the solution have smaller droplet sizes.

After the components of the precursor solution are combined, the cerium oxide precursor solution desirably is mixed thoroughly, and any undissolved components and particulate matter are removed therefrom. The removal of undissolved components and particulate materials can be accomplished by any suitable means, such as by filtration.

The cerium oxide precursor solution is aerosolized by any suitable means. In general, the precursor solution is used as a feedstock for an aerosol generator or atomizer, which converts the solution into a fine aerosol. Any suitable aerosol generator can be used. Suitable aerosol generators are capable of converting the precursor solution into an aerosol having an average droplet diameter or size of about 100 $\mu$m or less (e.g., about 10–100 $\mu$m or even about 10–50 $\mu$m). Suitable aerosol generators include ultrasonic atomizers, high-pressure atomizers, gas atomizers, and liquid jet atomizers using cross-current flow streams. Suitable liquid-jet atomizers are described, for example, in Ingebo, R. D. and H. H. Foster, NACA TN-4087, 1957, "Drop Size Distribution for Crosscurrent Breakup of Liquid Jets in Air Streams" and Weiss, M. A. and L. H. Worsham, *ARS J*, 29 (4), April, 1959, pp. 252–259, "Atomization in High Velocity Air Streams."

The aerosol of the cerium oxide precursor solution is passed through a high temperature reaction zone such as a flame, hot gas stream, oven, furnace or similar high temperature area. Preferably, the aerosol of the cerium oxide precursor solution is injected through the flame or into the hot gas stream located downstream of the flame. The flame can be produced by any suitable source that can generate sufficient heat to quantitatively convert the aerosol of the cerium oxide precursor solution to cerium oxide. Suitable flame sources provide a uniform and highly controlled reaction environment. Flames having suitable temperatures can be produced, for example, from fuels such as $H_2$, $CH_4$, and $H_2/CH_4$ mixtures and oxidants such as air or oxygen-nitrogen mixtures. The supply of fuel and oxidant to the flame can be adjusted in known ways by one of skill in the art to obtain the appropriate reaction temperature. Preferably, the amount of oxidant is sufficient to provide a ratio of oxidant to cerium oxide precursor solution of about 10–16 $Nm^3/kg$.

The reaction temperature is selected so that the resulting cerium oxide particulate composition has a suitable surface area. Some applications require higher surface areas, while for other applications, lower surface areas are suitable. To obtain higher surface areas, the reaction temperature desirably is about 700–2000 K. Preferably, the reaction temperature in a production scale reactor is about 700–1100 K, more preferably 700–925 K. Reaction temperatures that are much lower can cause the cerium oxide precursor solution to be incompletely converted to cerium oxide, which can result in lower surface areas and the introduction of impurities. Reaction temperatures that are much higher also tend to generate products having lower surface areas. The reaction temperature in a flame can be measured by methods known in the art, such as by thermocouples as described in Hung et al., *J. Mater. Res.*, 7, 1861–1869 (July 1992).

When the high temperature reaction zone is provided by a flame or a hot gas stream, the temperature of the flame or hot gas stream is, preferably, about 700–2000 K, more preferably about 1100–1900 K, such as about 1200–1400 K. The primary flame temperature, or temperature of a hot gas stream, can be determined by any suitable method known in the art. For example, the primary flame temperature of gas-flames can be calculated from the mainstream gas flow rate. In small-scale operations, the primary flame temperature is expected to approximate the reaction temperature. However, in production scale operations, the primary flame temperature is expected to be lower than the reaction temperature.

Figure 2:
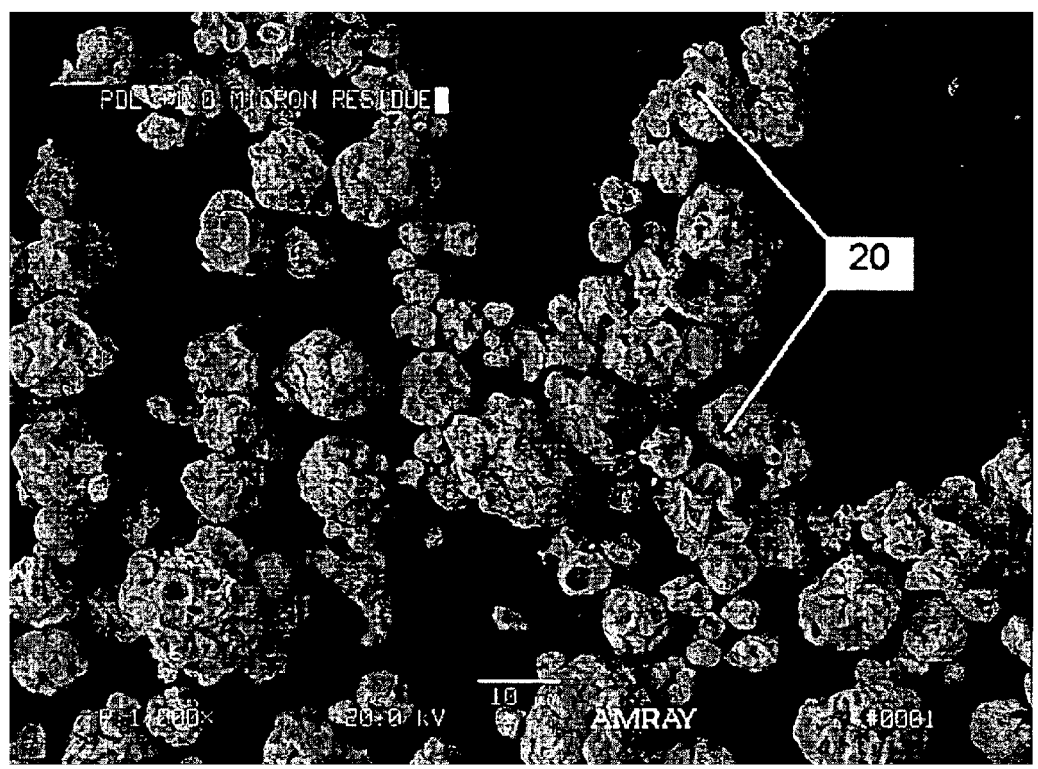
FIG. 2 is a scanning electron micrograph (1000x) illustrating the cenospherical aggregates of the cerium oxide particulate composition produced in accordance with the present invention.
Figure 3:
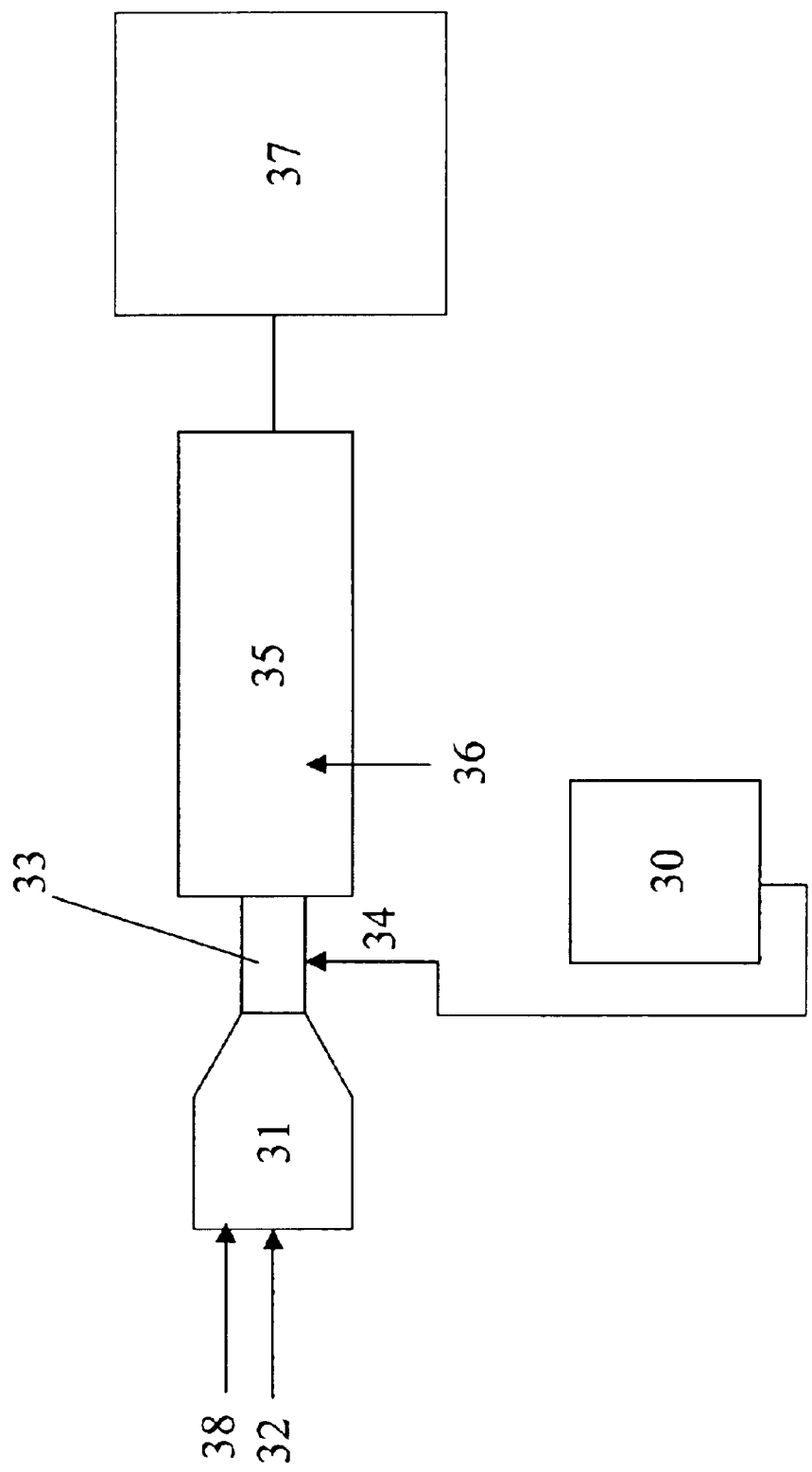
FIG. 3 is a schematic representation of a process for producing cerium oxide particulate compositions in accordance with the present invention.

As the aerosol of the cerium oxide precursor solution passes into the high temperature reaction zone, the solvent therein rapidly evaporates and the cerium oxide precursor is directly exposed to the reaction temperature. In the combustion process, the cerium oxide precursor is converted into particles of pure cerium oxide. The properties of the particles can vary in response to process parameters (e.g., reaction temperature, aerosol droplet diameter, precursor composition, precursor concentration, etc.). Typically, the cerium oxide particulate composition comprises, consists essentially of, or consists of two distinct particle morphologies. Some particles are branched, three-dimensional, chain-like aggregates of essentially spherical primary particles having an aciniform structure (hereinafter referred to as "aciniform aggregates") (see, e.g., FIG. 1(10)). Other particles have an approximately spherical structures (see, e.g., FIG. 1(11) and FIG. 2) having at least one hole (FIG. 2 (20)) that is visible via electron microscopy (hereinafter referred to as "cenospherical aggregates"). Without wishing to be bound by any particular theory, it is believed that the cenospherical aggregates are hollow and comprise, consist essentially of, or consist of, primary cerium oxide particles joined together to form the cenospherical aggregates. Generally, the method of the present invention can be used to provide a mixture of cenospherical and aciniform aggregates.

The cerium oxide particulate product exits the reaction zone and is cooled by any suitable means. The product can be cooled directly, for example, by quenching with a cooling gas or atomized liquid, and/or indirectly, for example, by passing the product through cooling tubes. Preferably, the product is quenched about 20–90 ms after passing through the high temperature reaction zone. After the aggregate particles are cooled, the cerium oxide particulate product is recovered by any suitable means. For example, the cerium oxide particulate composition can be separated from a cooling gas stream using a precipitator, cyclone separator, bag filter, or other means known to those skilled in the art.

The cerium oxide particulate composition produced in accordance with the present invention comprises, consists essentially of, or consists of aggregates consisting essentially of approximately spherical primary particles of cerium oxide, wherein at least some of the aggregates are cenospherical aggregates. Preferably the aggregates are a mixture of cenospherical and aciniform aggregates. Preferred cerium oxide particulate compositions prepared in accordance with the present invention comprise aggregates at least about 90% (by weight) or more of which are cenospherical aggregates. More preferably about 95% (by weight) or more, or even about 98% (by weight) or more of the aggregates are cenospherical aggregate particles. Typically, the remaining aggregates (e.g., about 10% (by weight) or less, about 5% (by weight) or less, or about 2% (by weight) or less of the aggregates) are aciniform aggregates. It is further believed that the reaction conditions used to produce the cerium oxide particulate composition can be varied to change the ratio of cenospherical aggregates to aciniform aggregates, as desired.

The force necessary to break the aciniform aggregates is considerable and often considered irreversible because of the fusion of those particles. The cenospherical aggregates are friable and are believed to breakdown into aggregates resembling the aciniform structure.

Desirably, no metal oxide other than cerium oxide is present in the aggregates. Of course, one of skill in the art can appreciate that allowance is made for the trace amounts of impurities present in suitable ingredients (e.g., commercially available ingredients) of the cerium oxide precursor solution.

As indicated above, the aggregates (e.g., aciniform and cenospherical aggregates) are each comprised of a large number of very small primary (generally spherical) particles, which are nearly uniform in size. The particle size of the primary particles and aggregate particles can be determined by conventional methods, for example, by using standard scanning electron microscopy (SEM) or transmission electron microscopy (TEM) techniques, or by calculating particle size based on the weight and density of the particles. Average particle size can be expressed as a function of the number of particles measured (average particle size "by number") or as a function of the weight of the particles measured (average particle size "by weight"). The terms "particle size" and "particle diameter" are used herein interchangeably to refer to the spherical diameter of a three-dimensional particle.

The primary particles are typically about 30 nm or less in average diameter (by number). In certain preparations, the primary particles have an average diameter (by number) of about 20 nm or less, and in other preparations the average primary particle diameter (by number) is about 15 nm or less, preferably about 10 nm or less. Thus, the primary particles in a given preparation can range in size from about 2–100 nm, preferably about 5–50 nm, more preferably about 5–25 nm.

The primary particles typically are composed primarily of crystalline cerium oxide in the cubic phase and are nonporous. In preferred preparations, the primary particles are between 50–99% crystalline, more preferably between about 75–99% crystalline, most preferably between about 90–99% crystalline. The cerium oxide particulate composition has a crystallite size ranging from about 1 nm to 30 nm, preferably about 2–20 nm, more preferably about 5–15 nm, as measured by x-ray diffraction peak broadening. In preferred compositions, each primary particle consists of a single cerium oxide crystal.

Preferably, the cerium oxide particulate composition exhibits a bimodal distribution of cenospherical and aciniform aggregates. Cenospherical aggregates typically range in size between about 0.5 and about 20 $\mu$m and have an average particle size (by weight) of about 1–20 $\mu$m, preferably about 5–10 $\mu$m. As mentioned, the cenospherical aggregates are believed to be hollow and can be further characterized by wall structures (e.g., microporous or porous wall structures) of between 0.1 and 2 $\mu$m in thickness.

The aciniform aggregates are typically about 500 nm or less in average diameter (by number). In certain preparations, the aciniform aggregates have an average diameter (by number) of about 200 nm or less, and in other preparations the average aciniform aggregate diameter (by number) is about 100 nm or less.

The surface area of the cerium oxide particulate composition generally is related to the size of the primary particles that comprise the cerium oxide aggregates. Preferred cerium oxide particulate compositions have a surface area, as calculated from the method of S. Brunauer, P. H. Emmet, and I. Teller, *J. Am. Chemical Society*, 60, 309 (1938), and commonly referred to as BET, of at least about 10 $m^2/g$ (e.g., at least about 20 $m^2/g$). The surface area of the cerium oxide particulate composition preferably is at least about 50 $m^2/g$ (e.g., about 50–150 $m^2/g$), more preferably at least about 70 $m^2/g$ (e.g., about 70–150 $m^2/g$). Most preferably, the surface area of the cerium oxide composition is at least about 80 $m^2/g$ (e.g. about 80–140 $m^2/g$).

The density of the cerium oxide particulate composition typically will be at least about 6 $g/cm^3$ (e.g., about 6–7 $g/cm^3$). As used herein, the term "density" refers to true density and may be measured, for example, using a helium pycnometer. In some preparations, the density will be at least about 6.5 $g/cm^3$, and in certain preparations the density can be substantially the density of pure cerium oxide (e.g., about 7 $g/cm^3$).

While not wishing to be bound to any particular theory, it is believed that, as a result of being made in a high temperature reaction zone (e.g., a high temperature flame) from a fine aerosol precursor solution, the cerium oxide particulate composition of the present invention has a more stable microstructure and a more pure form (as compared to, for example, cerium oxides prepared by certain alternative methods such as wet chemistry processes), thereby resulting in superior characteristics for many end-uses. In addition, the cerium oxide particulate composition prepared in accordance with the present invention generally has minimal contamination (in many cases, less than 100 ppm impurities), such that, typically, no additional purification or treatment is required prior to use of the cerium oxide particulate composition in many end-uses. Such additional purification or treatment steps, i.e., heat treatment steps, can increase the cost and complexity of the process and can have undesirable effects on the product, such as decreasing the surface area of the ceria particle.

As those of skill in the art will recognize, the cerium oxide particulate compositions of the present invention can have many uses. As mentioned, such compositions can be used in catalytic converter coatings, as an absorber for ultraviolet light, as a flow additive or thickening agent, in cosmetics, in mixtures for petroleum refining catalysts, in nickel-hydride batteries, as a glass additive, in structural ceramics, in televisions, as part of oxygen sensors, and as an iron or steel additive. The cerium oxide of the present invention can also be used as a polishing agent, for example, to polish substrates such as glass, metal, or ceramic substrates. The cerium oxide of the present invention can also be used to polish the surface of semiconductor substrates, for example, semiconductor substrate surfaces comprising metal (e.g., copper, aluminum, tungsten, tantalum, and the like), dielectrics (e.g., silica, silicon nitrides, and silicon composites), or mixtures of metals and dielectrics. Generally, when used to polish such substrates, the cerium oxide composition can be incorporated into a liquid carrier, such as water or a solution comprising chemical reagents (e.g., oxidizers, film forming agents, acids, bases, surfactants, complexing agents, and the like) to form a slurry that can be used to polish the surface of the substrate using, for example, a polishing pad. Such slurries are useful, for example, in conjunction with shallow trench isolation (STI) and interlevel dielectric layer (ILD) processing of semiconductor substrates. Other suitable uses for the cerium oxide particulate composition of the present invention are generally known in the art.

The following examples further illustrate the present invention but, of course, should not be construed as in any way limiting its scope.

EXAMPLE 1

This example illustrates a method of preparing a cerium oxide particulate composition in accordance with the present invention. A cerium oxide precursor solution, along with combustion air and fuel, is fed into a high-pressure atomizer. The high-pressure atomizer comprises a central tube encased in a burner tube. The central tube extends past the end of the burner tube and is configured with an outlet restriction nozzle. The cerium oxide precursor solution passes through the central tube and exits from the restricting outlet nozzle. As the precursor solution passes through the tube, it is heated by a burning fuel/air mixture that passes through the surrounding burner tube. Upon exiting the restriction nozzle, the solution is converted into an aerosol spray consisting of suitably sized droplets. The aerosol of the cerium oxide precursor solution is directed through a flame and is converted into a cerium oxide particulate composition.

EXAMPLE 2

This example illustrates an alternative method of preparing a cerium oxide particulate composition in accordance with the present invention. A cerium oxide precursor solution is subjected to gas atomization by use of a gas atomization device having three concentrically arranged tubes. Either air or a fuel/nitrogen mixture is passed through the inner tube; the cerium oxide precursor solution is passed through the middle tube, which is sandwiched between the inner and outer tubes, and a burning fuel/air mixture is passed through the outer tube. The flow rate of each mixture through the tubes is controlled so that, as the precursor solution exits the device, it is converted to an aerosol spray having suitably sized droplets. The aerosol of the cerium oxide precursor solution is directed through a flame and is converted into a cerium oxide particulate composition.

EXAMPLE 3

This example illustrates the effect of flame temperature on a cerium oxide particulate composition prepared in accordance with the present invention. A solution of 7 wt. % cerium acetylacetonate was prepared containing 10 wt. % methanol and 7 wt. % acetic acid (remaining wt. % water). The solution was aerosolized and passed through flames at two different temperatures, namely at 1150 K and 1400 K, as calculated based on the main stream gas flow rates. The solution was fed into the 1150 K flame at a rate of 55 l/min, using a combustion air flow rate of 250 l/min, hydrogen flow rate of 15 l/min, and natural gas flow rate of 4 l/min. The cerium oxide particulate composition formed in the reaction temperature of 1150 K had a BET surface area of 35 $m^2/g$, while the cerium oxide particulate composition formed in the reaction temperature of 1400 K had a BET surface area of 60 $m^2/g$.

EXAMPLE 4

This example illustrates an alternative method of preparing a cerium oxide particulate composition in accordance with the present invention, and is further illustrated in the schematic representation provide by FIG. 3. A cerium oxide precursor solution (30) is prepared containing 13.5 wt. % cerium acetate sesquihydrate, 10 wt. % methanol, and 0.4 wt. % nitric acid (remaining wt. % water). Natural gas (38) and an excess of air (32) are ignited in a burner (31) to produce a high temperature flame/gas stream (1200 K). The hot gas stream is accelerated by passing through a venturi restriction (33), creating a high temperature, high shear environment. The cerium oxide precursor solution (30) is introduced into this environment through a liquid jet stream (34) and is atomized via the high shear in the venturi (33). A suitable combustion air/cerium oxide precursor solution ratio is 15 $Nm^3$ air/kg solution. The high temperature, combusting environment rapidly evaporates the precursor solution solvents, allowing for conversion of the cerium oxide precursor to form the cerium oxide particulate composition as the precursor passes from the high shear environment of the venturi (33) into the reactor (35). Measured reaction temperatures after addition of the cerium oxide precursor solution is approximately 875 K. After a suitable reaction time (25 ms), the reaction mixture (cerium oxide particulate composition and combustion off gasses) is cooled by introduction of a finely atomized water spray (36) sufficient to allow collection of the cerium oxide particulate composition through the use of a bag filter (37). The cerium oxide particulate composition was of good quality and had a surface area of 90 $m^2/g$.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A cerium oxide particulate composition comprising aggregates consisting essentially of approximately spherical primary particles of cerium oxide, wherein the aggregates comprise a mixture of cenospherical and aciniform aggregates.

2. The composition of claim 1, wherein about 90% or more (by weight) of the aggregates are cenospherical aggregates.

3. The composition of claim 2, wherein about 95% or more (by weight) of the aggregates are cenospherical aggregates.

4. The composition of claim 3, wherein about 98% or more (by weight) of the aggregates are cenospherical aggregates.

5. The composition of claim 1, wherein the primary particles have an average diameter (by number) of about 30 nm or less.

6. The composition of claim 5, wherein the primary particles have an average diameter (by number) of about 20 nm or less.

7. The composition of claim 6, wherein the primary particles have an average diameter (by number) of about 10 nm or less.

8. The composition of claim 1, wherein the aggregates have a density of about 6 g/cm$^3$ or more.

9. The composition of claim 8, wherein the aggregates have a density of about 6–7 g/cm$^3$.

10. The composition of claim 1, wherein the cenospherical aggregates have an average diameter (by weight) of about 1–20 μm.

11. The composition of claim 10, wherein the cenospherical aggregates have an average diameter (by weight) of about 5–10 μm.

12. The composition of claim 1, wherein the aciniform aggregates have an average diameter (by number) of about 500 nm or less.

13. The composition of claim 12, wherein the aciniform aggregates have an average diameter (by number) of about 200 nm or less.

14. The composition of claim 13, wherein the aciniform aggregates have an average diameter (by number) of about 100 nm or less.

15. The composition of claim 1, wherein the aggregates have a surface area of about 50 m$^2$/g or more.

16. The composition of claim 15, wherein the aggregates have a surface area of about 70 m$^2$/g or more.

17. The composition of claim 1, wherein the primary particles have a crystallite size of about 1–30 nm.

18. The composition of claim 17, wherein the primary particles have a crystallite size of about 5–15 nm.

* * * * *